United States Patent [19]
Asama et al.

[11] Patent Number: 5,766,659
[45] Date of Patent: Jun. 16, 1998

[54] OILY COMPOSTION AND FROZEN FOOD

[75] Inventors: Koji Asama, Kitasoma-gun; Koji Umeno, Matsudo; Yoichi Tashiro, Kitasoma-gun, all of Japan

[73] Assignee: Fuji Oil Company, Limited, Japan

[21] Appl. No.: 671,786

[22] Filed: Jun. 20, 1996

[30] Foreign Application Priority Data

Jun. 30, 1995 [JP] Japan ................... 7-166362

[51] Int. Cl.$^6$ ................ A23G 1/00; A23G 9/24
[52] U.S. Cl. ........... 426/100; 426/101; 426/306; 426/307; 426/607; 426/613; 426/660
[58] Field of Search ................ 426/100, 101, 426/660, 103, 302, 303, 306, 307, 611, 613, 601, 607, 565, 612; 554/157

[56] References Cited

U.S. PATENT DOCUMENTS

| | | | |
|---|---|---|---|
| 2,524,291 | 10/1950 | Hoffman | 99/148 |
| 3,223,532 | 12/1965 | Pinkalla et al. | 426/101 |
| 4,396,633 | 8/1983 | Tresser | 426/100 |
| 4,446,165 | 5/1984 | Roberts | 426/602 |
| 4,874,618 | 10/1989 | Seaborne et al. | 426/103 |
| 4,906,412 | 3/1990 | Zielinski et al. | 266/398.5 |
| 5,147,670 | 9/1992 | Cebula et al. | 426/99 |
| 5,160,759 | 11/1992 | Nomura et al. | 426/602 |
| 5,271,950 | 12/1993 | Yamaguchi et al. | 426/100 |
| 5,273,763 | 12/1993 | Merz et al. | 426/602 |
| 5,451,416 | 9/1995 | Johnston et al. | 426/531 |
| 5,556,659 | 9/1996 | DePedro et al. | 426/101 |

FOREIGN PATENT DOCUMENTS

| | | |
|---|---|---|
| 0 078 568 | 5/1983 | European Pat. Off. |
| 0 502 697 | 9/1992 | European Pat. Off. |
| 55-114261 | 9/1980 | Japan |
| WO95/14392 | 6/1995 | WIPO |
| WO96/10338 | 4/1996 | WIPO |
| WO96/10339 | 4/1996 | WIPO |

*Primary Examiner*—Cynthia L. Nessler
*Attorney, Agent, or Firm*—Wenderoth, Lind & Ponack

[57] ABSTRACT

There is disclosed an oily composition for inhibiting moisture migration in frozen food which includes 1- or 3-saturated diunsaturated triglycerides (SUU) and 2-unsaturated disaturated triglycerides (SUS) in a total amount thereof of at least 40% by weight based on the total weight of oil-and-fat ingredient of said composition and the weight ratio of SUU to SUS is 0.3 to 3.0 times. A frozen food including the above oily composition provided between a low moisture content-ingredient and a high-moisture content-ingredient is also disclosed.

10 Claims, No Drawings

OILY COMPOSTION AND FROZEN FOOD

FIELD OF THE INVENTION

The present invention relates to an oily composition for inhibiting moisture migration in frozen food and frozen food using it.

BACKGROUND OF THE INVENTION

In ice cream compositions with edible containers such as ice cream cones, wafers having other shapes and the like, chocolate has often been utilized as a coating on the inner surfaces of the edible containers. In addition to providing chocolate flavor, this coating is applied so as to inhibit migration of water from ice cream compositions (including not only "ice cream" but also other frozen desserts such as "ice milk" and "lacto-ice" having less milk solids or milk fat and hereinafter merely referred to as ice cream composition) to edible containers with time and thereby desired crispy mouthfeel of edible containers is maintained. However, it cannot be said that, in view of the cycle of commercial products in the actual market, capability for inhibiting moisture migration of presently available chocolate is sufficient.

JP-A 57-170147 has proposed a method for coating a frozen molded confectionery and an edible container with an edible oil-and-fat coating composition. JP-A 5-316931 has proposed a method for flowing down fluidized whippable ice coating chocolate on an inner surface of an edible container with tilting and rotating the container and solidifying it. However, in these known methods, there is a problem that they require complicated production steps or facilities.

Moreover, in a product produced by mixing a low moisture-content material such as roasted almond, corn flakes or the like with chocolate and coating an ice cream composition with the mixture, it is difficult to maintain crispy mouthfeel of the low moisture content-material by presently available techniques and there is a problem that quality of the product is gradually deteriorated during storage.

As indicated above, an edible material having enough efficiency to inhibit migration of water from a high moisture content-ingredient to a low moisture content-ingredient within a freezing temperature range and thereby to maintain quality of a product for a long period of time has not been found heretofore in the prior art.

OBJECTS OF THE INVENTION

An object of the present invention is to provide an oily composition having very high capability for inhibiting moisture migration even if a low moisture content-ingredient is brought into contact with a high moisture content-ingredient within a freezing temperature range.

Another object of the present invention is to provide a frozen food using the composition of the present invention.

These objects as well as other objects and advantages of the present invention will become apparent to those skilled in the art from the following description.

SUMMARY OF THE INVENTION

The present inventors have studied intensively so as to attain the above objects and, as a result, have completed the present invention.

Thus, according to the present invention, there is provided an oily composition for inhibiting moisture migration in frozen food which comprises 1- or 3-saturated diunsaturated triglycerides (SUU) and 2-unsaturated disaturated triglycerides (SUS) in a total amount thereof of at least 40% by weight based on the total weight of oil-and-fat ingredient in said composition and the weight ratio of SUU to SUS is 0.3 to 3.0 times.

The present invention also provide a frozen food comprising the above oily composition provided between a low moisture content-ingredient and a high-moisture content-ingredient.

DETAILED DESCRIPTION OF THE INVENTION

Firstly, the oily composition of the present invention and its production is illustrated.

S of SUU and SUS used in the present invention is a saturated fatty acid residue having 12 to 22 carbon atoms. Preferably, in view of good mouthfeel upon eating, almost all the S's have 16 or 18 carbon atoms and, in particular, for food to be eaten at a relatively low temperature (chilled to frozen), it is desired that the amount of S having 16 carbon atoms becomes the largest. U is an unsaturated fatty acid residue having 16 or more carbon atoms and, preferably, a residue of oleic acid or linoleic acid.

The weight ratio of SUU:SUS in the oil-and-fat ingredient of the composition is 0.3 to 3:1. When the amount of SUU is too small, moisture migration is hardly inhibited. This may be resulted from formation of fine interstices due to formation of a large amount of crystals within a freezing temperature range. When SUS is too small, it is difficult to distribute and solidify the composition on a surface of a food material as uniform as possible because an amount of crystals is small even upon cooling the melted oily composition to a working temperature at about room temperature. In particular, moisture migration is hardly inhibited, when using the composition about 2 mm or less in thickness. In addition, when the total amount of SUU and SUS is less than 40% by weight based on the oil-and-fat ingredient, moisture migration is also hardly inhibited. Preferably, the total amount thereof is not less than 45% by weight. When such oil-and-fat ingredient is placed at a freezing temperature range, it is possible to form a fine film or membrane-like layer wherein formation of fine interstices is hardly taken place and thereby moisture migration between ingredients of frozen food can be inhibited.

Suitable oils and fats to be used as the oil-and-fat ingredient of the composition of the present invention can be obtained by fractionation of palm oil. For example, fractionated oil having iodine value (IV) of 48 or higher such as so-called palm olein, palm superolein and the like can be suitably used.

However, the present invention is not limited to the above oils and fats and, in so far as the above requirements are met as a whole, any oils and fats can be used. For example, there can be used vegetable oils and fats such as rapeseed oil, soybean oil, sunflower oil, cottonseed oil, peanut oil, rice bran oil, corn oil, safflower oil, olive oil, kapok oil, sesame oil, evening primrose oil, palm kernel oil, coconut oil, sal fat, shea butter, cacao butter and the like; and animal oils and fats such as milk fat, beef fat, lard, fish oils, whale oil and the like. These oils and fats can be used alone or in combination thereof.

The oily composition of the present invention may be composed of only the above oil-and-fat ingredient. Optionally, an oily material having a melting point of 50° C. or higher can be used together with the above oil-and-fat ingredient. When a small amount of the oily material having a melting point of 50° C. or higher is further contained in the oily composition of the present invention, workability of the composition upon applying to frozen food is improved, which results in improvement of moisture migration resistance in frozen food. The oily material is preferably used in an amount of 0.1% by weight or more, preferably, 0.5 to 5% by weight based on the oil-and-fat ingredient in the composition. When the amount is too small, sometimes, rapid crystallization from a melted state to a cooled state of the oil-and-fat ingredient is hardly taken place and a longer period of time is required, which results in lowering of workability or insufficient moisture migration resistance due to uneven distribution caused by dripping before solidification. As the oily material, for example, monoglycerides whose constituent fatty acid is a saturated fatty acid having 12 or more carbon atoms, preferably 18 to 24 carbon atoms and oils and fats containing long chain saturated fatty acids having 20 to 22 carbon atoms such as hydrogenated oils of rapeseed oil, fish oils and the like can be suitably used.

When using the composition containing the oily material having a melting of 50° C. or higher, preferably, this oily material is once completely dissolving in the oil-and-fat ingredient prior to use. For this purpose, the oily material is mixed with the oil-and-fat ingredient at a temperature suitable for melting property or solubility of the oily material. Then, the resulting mixture, i.e., the oily composition of the present invention is sprayed or applied on a surface of a material to be coated at a temperature somewhat higher than room temperature at which fluidity of the composition is not lost and is quickly solidified in a working atmosphere. Thus, it is assumed that crystals of the oily material having a high melting point is firstly deposited to accelerate the growth of solid fats such as SUS and the like in the oil-and-fat ingredient, to form a firm three-dimensional net work and to wrap a suitable amount of liquid fats at a freezing temperature range to block interstices between crystals, thereby inhibiting or preventing moisture migration. Then, if the oily material having a higher melting point is not incorporated into the composition, it is necessary to take time until taking place of a certain degree of solidification of the oil-and-fat ingredient or to lower a cooling temperature.

In addition, the oily composition of the present invention can be used in the form of a material containing other solids such as coating chocolate and any desired flavor and color can be provided. In some cases, for improving moisture migration preventing function, it is desired that the composition further contains solids other than the oil-and-fat ingredient. That is, for example, in the case of an ice cream composition in a cone cup, the ice cream composition is filled into the cone cup immediately after coating the cone with the oily composition, the coating formed is not yet fully solidified. However, when such solids are present, they improve physical strength of the coating and then prevent moisture migration.

Examples of solids include known powder food or food materials such as starch, powdered cheese and the like in addition to well known chocolate ingredients such as whole milk powder, skimmed milk powder, cacao mass, cocoa powder and sugar and the like. A weight ratio of the oil-and-fat ingredient including the oily material if any to the other solids are preferably 4:6 to 10:0.

The oily composition of the present invention can function as a barrier having moisture migration-preventing function between ingredients in frozen food. Then, the present invention provides a frozen food in which the above oily composition of the present invention is present between a low moisture content-ingredient and a high moisture content-ingredient.

The oily composition can be readily used according to a conventional manner for using a conventional oil-and-fat coating composition such as application, spray, dipping, enrobing and the like.

The terms "lower moisture content" and "higher moisture content" used herein are not referred to any specific amounts of moisture content. Such terms are simply used so as to show that there is a difference in moisture contents between both ingredients and the moisture content of the higher moisture content-ingredient is higher than that of the lower moisture content-ingredient.

As the low moisture content-ingredient, there are, for example, ice cream cone, other wafers, nuts such as almond nuts, peanuts and the like, cereal flakes such as corn flakes, cereal puff, batter for fried food, crumbs and the like. As the high moisture content-ingredient, there are, for example, ice cream compositions, ingredients to be fried and the like.

For providing the composition between the low moisture content-ingredient and the higher moisture content-ingredient, in general, one ingredient is coated with the oily composition and then mixed or brought into contact with the other ingredient. In addition, by using an encrusting machine, an inner ingredient, the oily composition of the present invention and an outer ingredient can be extruded in the form of a three-layered material.

When the food of the present invention thus obtained wherein the oily composition is provided between a high moisture content-ingredient and a low moisture content-ingredient is stored at a freezing temperature range, moisture migration between these ingredients can be inhibited and, as a whole, the food having good quality can be obtained.

The following Examples and Comparative Examples further illustrate the present invention in detail but are not to be construed to limit the scope thereof. In these Examples and Comparative Examples, all the "parts" and "percents" are by weight unless otherwise stated.

EXAMPLES 1, 2 AND 3

Palm fractionated oil A (SUU 29.4%, SUS 34.2%, IV 58, softening point 18° C.) or a mixture of this and stearyl monoglyceride (distilled monoglyceride) melted at 70° C. was used in the production of a chocolate mix of the formulation disclosed in the following table according to a conventional method (softening point was measured by the standard oil-and-fat analytical test method of Japanese Oil Chemistry Association 2.3.4.3-86).

| | Examples | | |
|---|---|---|---|
| Ingredients | 1 | 2 | 3 |
| Palm fractionated oil A | 50.0% | 48.5% | 67.9% |
| Cocoa | 10.0 | 10.0 | 6.0 |
| Sugar | 39.65 | 39.65 | 23.65 |
| Lecithin | 0.3 | 0.3 | 0.3 |
| Vanilla flavor | 0.05 | 0.05 | 0.05 |
| Stearyl monoglyceride | 0.0 | 1.5 | 2.1 |

In Example 1, after the chocolate mix (6 g) was sprayed on the inner surface of a cone cup (surface area: 75 $cm^2$) at 35° C., it was necessary to stand it at 5° C. for 10 minutes. On the other hand, in Examples 2 and 3, the inner surface of a cone cup was able to be coated with a chocolate layer immediately in uniform thickness only by spraying the chocolate mix (6 g) as it is at 50° C. on the inner surface of the cone cup at room temperature. "Lacto-ice" (overrun: 50%) extruded from a continuous ice cream freezer (manufactured by Daito Syokuhin Kikai, Japan) was filled into the cone cup and the upper surface thereof was also coated with the same chocolate. This was quickly frozen at −35° C. or lower with a shock freezer (Tobi, Dekor Co., Ltd., Holland) for one hour.

The ice cream composition with cone cup was sealed and packed individually and stored at −15° C. The change in state of each cone cup with time was evaluated. As a result, after 6 months, moisture contents of respective cone cups were 10.5% for Example 1, 8.5% for Example 2 and 9.5% for Example 3. All of them had good hardness and mouthfeel.

When the ice cream composition with the cone cup was cut and its cross section was observed, for each Example, a chocolate layer having uniform thickness was adhered to the cone cup.

Comparative Examples 1, 2 and 3

According to the same manner as that described in Example 2, an ice cream composition with a cone cup was produced except that palm fractionated oil B (SUU 13.9%, SUS 60.2%, IV 45, softening point 25° C.), soybean oil (SUU 29.3%, SUS 5.9%, IV 132, softening point could not be measured) or an oil-and-fat mixture of soybean oil, coconut oil and palm fractionated oil C (SUU 20.6%, SUS 18.3%, IV 58, softening point 17.5° C.) instead of palm fractionated oil A.

| Ingredients | Comparative Examples | | |
|---|---|---|---|
| | 1 | 2 | 3 |
| Palm fractionated oil B | 48.5% | — | — |
| Palm fractionated oil C | — | — | 24.0% |
| Coconut oil | — | — | 14.5 |
| Soybean oil | — | 48.5% | 10.0 |
| Cocoa | 10.0 | 10.0 | 10.0 |
| Sugar | 39.65 | 39.65 | 39.65 |
| Lecithin | 0.3 | 0.3 | 0.3 |
| Vanilla flavor | 0.05 | 0.05 | 0.05 |
| Stearyl monoglyceride | 1.5 | 1.5 | 1.5 |

In Comparative Examples 2 and 3, moisture contents of the cone reached 15% after 3 weeks and the cones were softened. Then, commercial value was spoiled. Although the chocolate layer of the cross section of the cone was uniform, fine interstices were observed. In Comparative Example 2, moisture content of the cone reached 15% after 3 weeks. The chocolate layer of the cross section of the cone was push aside by pressure of filling of the ice cream composition and had uneven thickness. Then commercial value was also spoiled.

Example 4 and Comparative Example 4

Corn flakes were dipped in a melded oily composition as shown in the following table to coating the surfaces thereof with the composition and the composition was solidified at −20° C. The corn flakes thus prepared were sprinkled on "lacto-ice" filled in a cup to bring into contact with the ice cream composition. It was stored at −15° C. and the change in the state of the corn flakes with time was evaluated. In Example 4, the corn flakes maintain good hardness and mouthfeel even after 6 months. On the other hand, in Comparative Example 4, the corn flakes were softened after 1 week and the commercial value was spoiled.

| Ingredients | Example 4 | Comparative Example 4 |
|---|---|---|
| Palm fractionated oil A | 98.2% | — |
| Cacao butter (SUU 8.5%, SUS 79.6%, IV 35, softening point 34° C.) | — | 98.2% |
| Lecithin | 0.3 | 0.3 |
| Behenyl monoglyceride | 1.5 | 1.5 |

As described hereinabove, by using the oily composition of the present invention, increase in moisture content of a low moisture content-ingredient in food containing both low and high moisture content-ingredients at a freezing temperature range can be inhibited and the original good crispy mouthfeel can be maintained.

What is claimed is:

1. An oily composition for inhibiting moisture migration in frozen food which comprises:
   an oil-and-fat ingredient comprising 1- or 3-saturated diunsaturated triglycerides (SUU) and 2-unsaturated disaturated triglycerides (SUS), wherein the oil-and-fat ingredient is a fractionated palm oil having an iodine value of at least 48 and substantially all of saturated fatty acid residue (S) has 16 or 18 carbon atoms, in a total amount thereof of at least 40% by weight based on the total weight of oil-and-fat ingredients of said composition, the weight ratio of SUU:SUS in said composition being 0.3 to 3.0:1, and an oily material having a melting point of not lower than 50° C.

2. An oily composition according to claim 1, wherein the oily material is a saturated fatty acid monoglyceride.

3. An oily composition according to claim 1, wherein the oily material is used in an amount of 0.1 to 5% by weight based on the oil-and-fat ingredient in the composition.

4. An oily composition according to claim 1, wherein the composition further comprises solids.

5. An oily composition according to claim 4, wherein the solids are one or more members selected from the group consisting of whole milk powder, skimmed milk powder, cacao mass, cocoa powder, sugar, starch and powdered cheese.

6. An oily composition according to claim 4, wherein a weight ratio of the oil-and-fat ingredient including the oily material to the other solids are 4:6 to 10:0.

7. A frozen food comprising the oily composition according to claim 1 provided between a low moisture content-ingredient and a high-moisture content-ingredient.

8. A frozen food according to claim 7, wherein the low moisture content-ingredient is a member selected from the group consisting of ice cream cones, wafers, nuts, cereal flakes, cereal puff, batter for fried food and crumbs and the high moisture content-ingredient is a member selected from the group consisting of ice cream compositions and ingredients to be fried.

9. A process for producing a frozen food which comprises coating one ingredient of the frozen food with the oil composition of claim 1 and then bringing it into contact with another ingredient having a higher moisture content than that of said one ingredient.

10. The process according to claim 13, wherein the ingredient to be coated with the oily composition is an ice cream cone or wafer.

* * * * *